United States Patent

Sanford

[11] 4,052,781
[45] Oct. 11, 1977

[54] ROTATION-TO-RECIPROCATING MOTION CONVERTING TOOL

[75] Inventor: B. Paul Sanford, Houston, Tex.

[73] Assignee: Cougar Instruments Corporation, Houston, Tex.

[21] Appl. No.: 703,491

[22] Filed: July 8, 1976

[51] Int. Cl.² .......................................... B23P 23/00
[52] U.S. Cl. .......................................... 29/560; 74/57; 90/43; 90/96
[58] Field of Search .................. 74/57, 99; 90/43, 96, 90/38; 29/560, 26 R

[56] References Cited

U.S. PATENT DOCUMENTS

| 1,415,819 | 5/1922 | Estep et al. | 90/43 |
| 3,388,603 | 6/1968 | Clark | 74/57 |
| 3,421,397 | 1/1969 | Clark | 74/57 X |
| 3,792,616 | 2/1974 | Wentzel | 74/57 |

*Primary Examiner*—Harrison L. Hinson
*Assistant Examiner*—W. D. Bray
*Attorney, Agent, or Firm*—Michael P. Breston

[57] ABSTRACT

The tool attachment for converting rotating into reciprocating motion comprises a hollow traveling body having a radial bore and an axial bore therein. A bearing housing is removably mounted in the radial bore. A ram is movably mounted in the bore's axial bore. The ram has on its outer periphery a single closed groove having a pitch depending on the desired reciprocating stroke of the ram. A roller is rotatably mounted in the bearing housing and has a portion thereof disposed in the groove. Restraining means couple the ram to the machine whereby the ram is restrained against rotation and unrestrained against longitudinal motion upon the rotation of the traveling body by a rotatable member of a machine fixedly coupled to the body.

6 Claims, 10 Drawing Figures

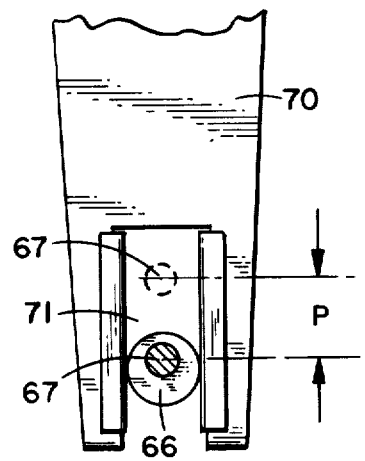
FIG. 3.
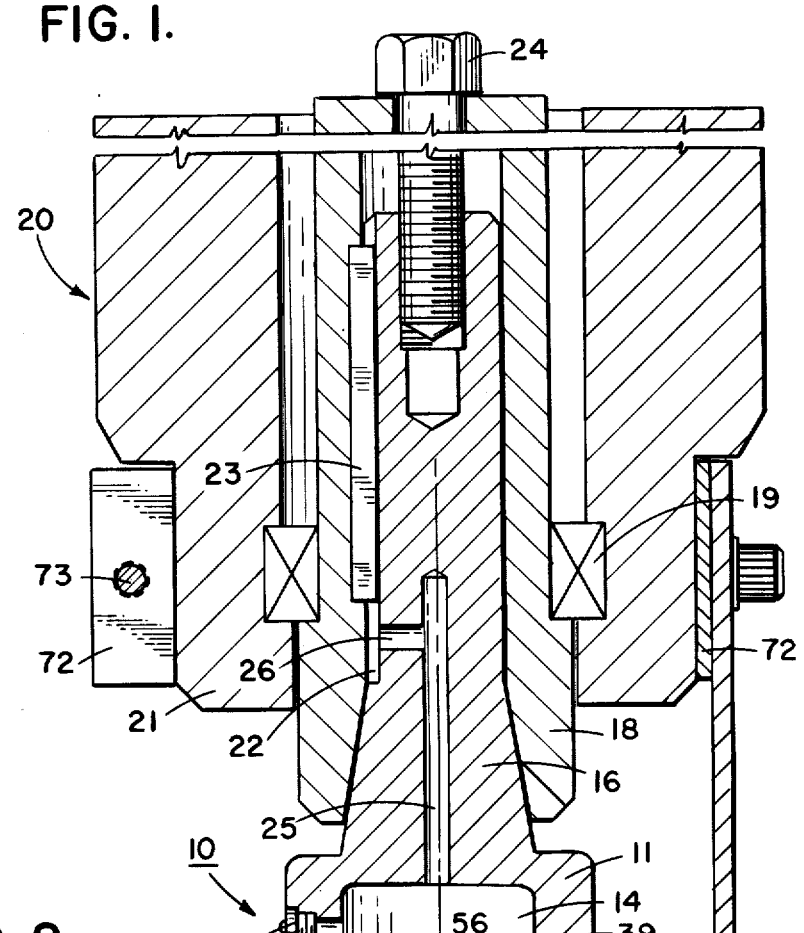
FIG. 1.
FIG. 2.
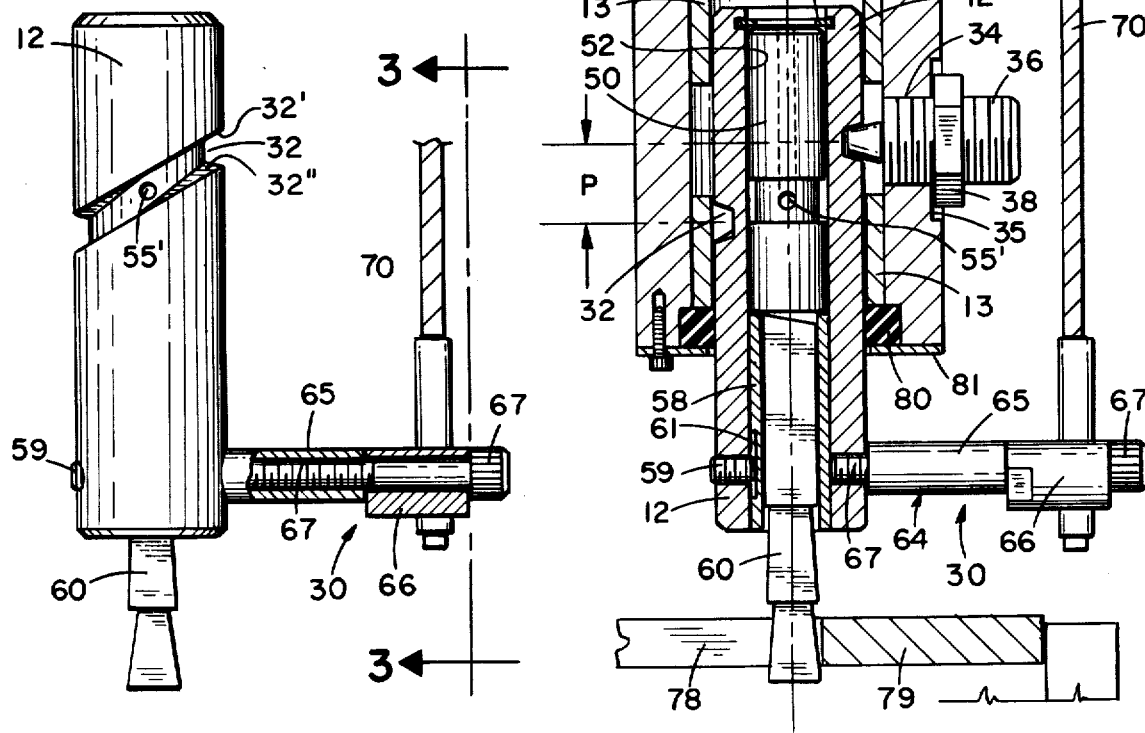

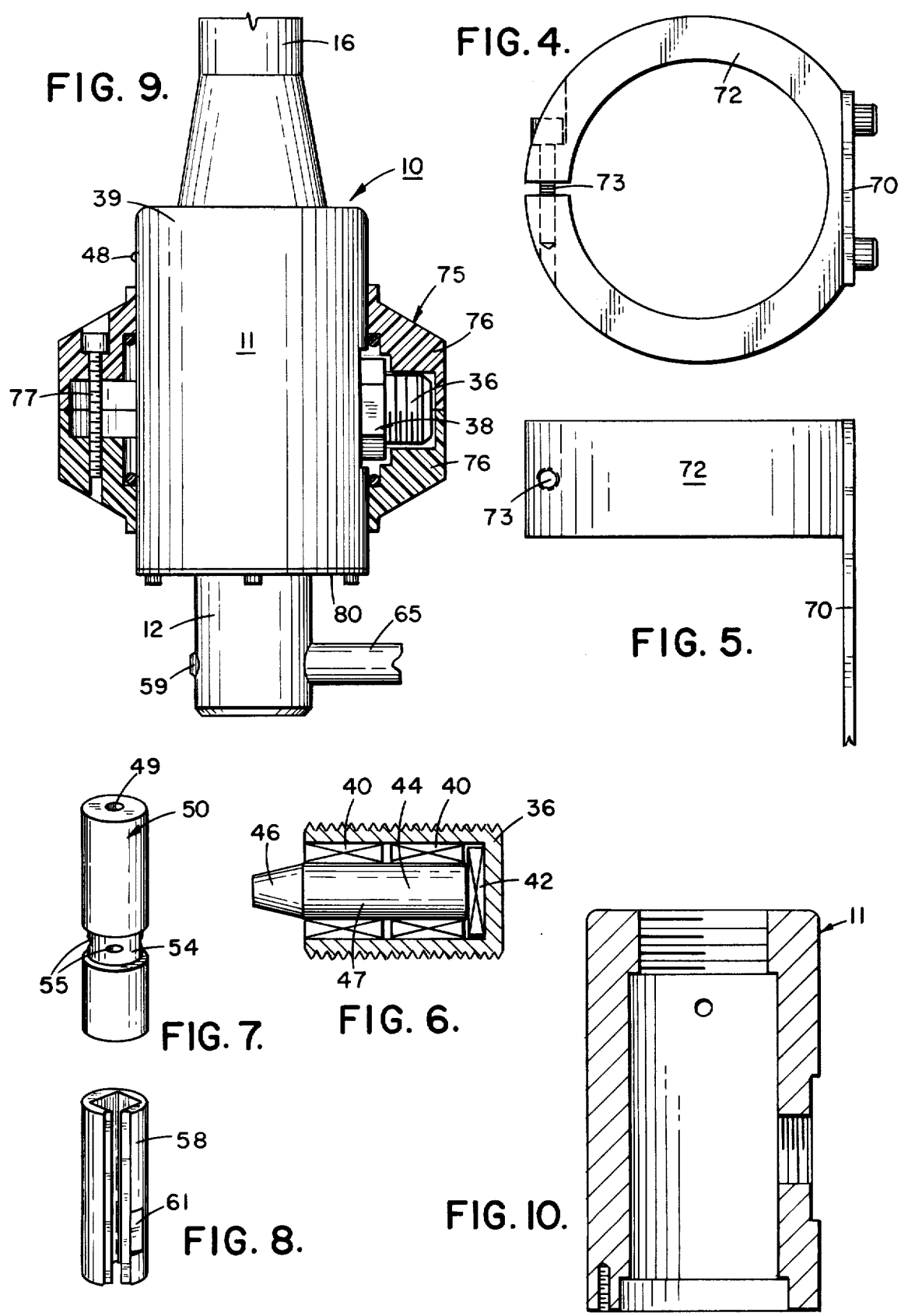

ROTATION-TO-RECIPROCATING MOTION CONVERTING TOOL

BACKGROUND OF THE INVENTION

This invention relates to a rotation-to-reciprocating motion converting tool which is especially adapted for being directly coupled to milling machines and the like.

Rotation to linear motion converting tools presently on the market include a slider-crank mechanism with the rotation axis at a right angle to the linear motion. Such tools frequently require independent drives, are relatively complicated to use, and are relatively expensive. These drawbacks are particularly disadvantageous to owners of milling machines and the like who need an inexpensive motion converting device which is relatively easy to attach to a rotating member of the milling machine without disturbing the set up of the work piece relative to the rotating member so that milling operations can be followed by shaping operations, without occasioning a considerable amount of down time, and can be carried out by the power drive of the milling machine.

Accordingly, it is a general purpose of this invention to provide a simple, light weight, efficient, and relatively low cost shaping attachment tool capable of changing rotary motion to reciprocating motion. With the reciprocating motion being in alignment with the rotation axis, the tool is easy to set up, easy to assemble, and readily acceptable by the spindle of the milling machine.

SUMMARY OF THE INVENTION

According to the present invention, a preferred embodiment of the motion converting shaping attachment comprises a traveling hollow body and a ram movably mounted in the bore of the body, the ram having on its outer periphery a closed groove which may be polygonal in cross-section. A roller is disposed in the groove for rolling contact with the walls thereof. The roller is rotatably mounted in a housing positioned in the wall of the traveling body.

To effect rotation of the traveling body, the body is provided with an outwardly extending shank adapted to be removably received by a rotating member of a machine, such as by the spindle of a milling machine. Adjustable restraining means couple the ram to a stationary member which can be part of the machine for restraining the ram against rotation while leaving it free to reciprocate. The ram will reciprocate without rotation along its longitudinal axis.

BRIEF DESCRIPTION OF THE DRAWINGS

FIG. 1 is a vertical, sectional view of a preferred embodiment of the invention shown to be operatively coupled to the spindle of a milling machine;

FIG. 2 is a view in elevation of the reciprocating ram and of a portion of the restraining means;

FIG. 3 is a partial view on line 3—3 in FIG. 2 showing the operation of the restraining means;

FIG. 4 is a top plan view of the restraining means;

FIG. 5 is a side elevation view of the restraining means;

FIG. 6 is a sectional view of the roller housing;

FIG. 7 is a view in perspective of a plug in the bore of the ram;

FIG. 8 is a view in perspective of a socket positioned below the plug in the lower half of the bore of the ram;

FIG. 9 is a view in perspective of the traveling body and a sectional view of a cover thereon covering the roller housing; and FIG. 10 is a sectional view of a modified embodiment of the traveling body.

DESCRIPTION OF THE PREFERRED EMBODIMENT

In the drawings the same numerals will be used to designate the the same or similar parts. The motion converting tool attachment embodying the invention, generally designated as 10, comprises a traveling hollow body 11 having a bore 14. A hollow cylindrical ram 12, having a longitudinal bore 52 extending therethrough, is movably mounted on suitable bearing means 13.

To impart rotation to the body 11, there is provided an axially and upwardly extending shank 16 which may form integral part with body 11 (FIGS. 1–9) or which may be threadedly secured thereto, as shown in FIG. 10. Shank 16 has a standard geometric configuration adapted to be received by the spindle 18 of a milling machine, generally designated as 20. Spindle 18 is rotatably mounted on bearings 19 about the stationary quill 21 of the machine. Shank 16 has a keyway 22 which slides over a guide 23 in the spindle. The shank is tightened in position by the threaded bolt 24 of the milling machine 20.

To prevent pressures from developing in bore 14 of the traveling body 11, there is provided an air channel 25 between an opening 26 in the keyway 22 and bore 14. On the outer wall of ram 12 is machined a single loop or groove 32 preferably having a polygonal cross-section. The apex of the angle formed by the side walls 32', 32" of the groove lies on the longitudinal axis of the ram. The pitch P of loop 32 determines the reciprocating stroke of the ram. Obviously, the shape of groove 32 may be varied as is best suited for the particular motion desired.

Extending through the cylindrical wall 39 of the body 11 is a threaded radial bore 34 adapted to receive a threaded roller housing 36. Bore 34 is provided with a counterbore 35 against which abuts a lock nut 38. The roller housing comprises sleeve bearings 40 and a thrust bearing 42 rotatably and axially supporting a roller 44. The roller has a frosto-conical surface 46 at its free end and the remainder being a cylindrical surface 47.

To allow for the lubrication of the moving parts there is provided an oil valve 48 near the upper end of the cylindrical wall 39 which is in communication with bore 14. An oil passage 49 extends through a cylindrical plug 50 inside the axial bore 52 of the ram 12. Plug 50 has an annular depression 54 provided with one or more openings 55 in communication with the oil channel 49 (FIGS. 1,7). Holes 55 also communicate with one or more holes 55' in the groove 32 (FIG. 2) for lubricating the roller. To prevent the oil from leaking outside, there is provided an annular bottom seal 80 which is secured to the lower end of the traveling body by a retaining plate 81.

The plug 50 is retained in bore 52 by a snap ring 56 which seats in an annular groove machined in the inner wall of bore 52. Below plug 50 is positioned a split socket 58 (FIG. 8) which is restrained by a set screw 59. Socket 58 is adapted to receive a shaping device 60. Screw 59 applies a radial force over a flat surface 61 to secure the device 60 in the socket.

The restraining means 30 include a torque arm 64 comprising a cylindrical sleeve 65 and an eccentric sleeve 66 through which extends a threaded bolt 67 securing the torque arm to the lower end of the ram 12. A vertically-extending strut arm 70 is provided having a U-shaped channel 71 at the free end thereof which is adapted to movably receive the eccentric sleeve therein. The upper end of arm 70 is secured to a strut collar 72 (FIG. 4) which fits around the quill of the machine and is secured thereto by a screw 73. A protective split cover 75 is made rotatable with body 11. Cover 75 has two halves 76 securable by a plurality of bolts 77.

In operation, the traveling body 11 maybe rotated by reversible power means forming part of the machine 20 and its speed may be controlled by the speed controller of the machine. The rotation of the traveling body 11 is translated into reciprocating motion by the ram 12 along its longitudinal axis while being restrained against rotation by the restraining means 30. Thus when a torque is applied on the body 11, the ram will move up and down and execute a harmonic oscillating motion without rotation about its longitudinal axis while the roller's surface 46 rolls over the inclined surfaces 32', 32" of the groove 32. Any desired shaping device 60 can be received by socket 58. A squaring tool attachment is illustrated in FIGS. 1 and 2 for squaring a hole 78 in a work piece 79 positioned below the tool 10, the hole having been previously drilled by the milling machine. Rotation of the eccentric sleeve 66 allows fine angular adjustment of the ram relative to the work piece 79, and rotation of the collar 72 about the quill allows coarse adjustment. It will be appreciated that the strut arm 70 may form integral part with the torque arm and all of the angular adjustment can be accomplished solely with the collar.

What is claimed is:

1. A tool attachment for a machine having a rotatable member, said tool converting rotating into reciprocating motion, comprising:
    a hollow traveling body having a radial bore and an axial bore therein;
    a bearing housing mounted in said radial bore,
    a ram movably mounted in said axial bore and having on its periphery a single groove, the groove having a pitch depending on the desired reciprocating stroke of the ram;
    a roller rotatably mounted in said bearing housing and having a portion thereof rollably disposed in said groove, and
    restraining means coupled between said ram and said machine, whereby, in use said ram remains restrained against rotation and unrestrained against longitudinal motion, upon rotation of said traveling body in either direction, and said roller imparts a reciprocating motion to said ram about its longitudinal axis.

2. The tool of claim 1 and further including an annular cover positioned about said traveling body adapted to cover said bearing housing.

3. The tool of claim 2 wherein said bearing housing is externally threaded and is threadably received in said radial bore.

4. The tool of claim 1 wherein said ram has an axial bore therethrough, a plug positioned within the upper end of the ram's bore, and a socket positioned at the lower end of the ram's bore adapted to receive a shaping device therein.

5. The tool of claim 4 wherein said restraining means include an annular collar securable to the quill of a milling machine, a torque arm, and a strut arm coupling the torque arm to the collar.

6. The tool of claim 5 wherein the torque arm includes a rotatable eccentric sleeve mounted for longitudinal movement within a channel at the free end of the strut arm.

* * * * *